United States Patent
Buckley

(10) Patent No.: US 8,144,360 B2
(45) Date of Patent: Mar. 27, 2012

(54) SYSTEM AND METHOD FOR PROCESSING PORTIONS OF DOCUMENTS USING VARIABLE DATA

(75) Inventor: Robert R. Buckley, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1084 days.

(21) Appl. No.: 11/003,182

(22) Filed: Dec. 1, 2004

(65) Prior Publication Data

US 2005/0141035 A1   Jun. 30, 2005

Related U.S. Application Data

(60) Provisional application No. 60/527,069, filed on Dec. 4, 2003.

(51) Int. Cl.
G06K 15/00 (2006.01)
G06K 9/34 (2006.01)
G06F 3/12 (2006.01)

(52) U.S. Cl. ...... 358/1.18; 358/1.15; 358/1.16; 382/173

(58) Field of Classification Search ........ 358/1.15, 358/1.18
See application file for complete search history.

(56) References Cited

U.S. PATENT DOCUMENTS

| | | | |
|---|---|---|---|
| 5,983,243 A * | 11/1999 | Heiney et al. | 715/235 |
| 6,049,390 A * | 4/2000 | Notredame et al. | 358/1.15 |
| 6,324,305 B1 | 11/2001 | Holladay et al. | |
| 6,466,210 B1 * | 10/2002 | Carlsen et al. | 345/629 |
| 6,701,012 B1 * | 3/2004 | Matthews | 382/173 |
| 2001/0000314 A1 | 4/2001 | Queiroz et al. | |
| 2001/0000710 A1 | 5/2001 | Queiroz et al. | |
| 2002/0073398 A1 * | 6/2002 | Tinker | 717/110 |
| 2002/0076103 A1 * | 6/2002 | Lin et al. | 382/173 |
| 2003/0101436 A1 * | 5/2003 | Kobrosly et al. | 717/128 |
| 2003/0116915 A1 * | 6/2003 | Rapp | 273/292 |
| 2004/0006742 A1 * | 1/2004 | Slocombe | 715/513 |
| 2004/0205047 A1 * | 10/2004 | Carpenter | 707/3 |

* cited by examiner

*Primary Examiner* — Benny Tieu
*Assistant Examiner* — Fan Zhang
(74) *Attorney, Agent, or Firm* — LeClairRyan, a Professional Corporation

(57) ABSTRACT

System and method for creating and processing documents with variable data is disclosed. The system provides a base set of document image data residing at a first location. The base set of document image data, such as rasterized image data or image data organized in a mixed raster content ("MRC") layer format, represents a first portion of information for a document that may not change. Further, the system obtains another set of document image data residing at a second location. The other set of document image data, which may again be rasterized image data or image data organized in an MRC layer format, represents a second portion of information for the document that may change. The system combines the base set of document image data with the other set of document image data to form a combined set of document image data for the document.

34 Claims, 7 Drawing Sheets

US 8,144,360 B2

SYSTEM AND METHOD FOR PROCESSING PORTIONS OF DOCUMENTS USING VARIABLE DATA

This application claims the benefit of U.S. Provisional Patent Application Ser. No. 60/527,069 filed Dec. 4, 2003 which is hereby incorporated by reference in its entirety.

FIELD

This invention relates generally to imaging and, more particularly, to a system and method for creating and processing base data files with image data representing a portion of a document that does not change and for creating and processing variable data files representing a portion of the document that may change.

BACKGROUND

Some portions of documents contain information that does not change while other portions of the same document can contain information that changes quite often. For instance, a marketing firm may use a brochure for a company's particular product that should be modified to suit or target particular audiences, such as individual consumers and commercial customers. In this regard, text describing the product may stay the same while the images contained in the brochure are changed to show the product being used in a commercial setting to suit commercial customers or to show the product being used by ordinary consumers in a retail environment.

In processing documents, such as the brochures in the example above, to be rendered (e.g., printing or displaying) using a rasterizing process, for instance, all of the portions of the document are processed even though some of the portions may not have changed since it was last rendered. This needless re-processing of the same, unchanged information results in wasting processing resources.

SUMMARY

A system for processing documents in accordance with embodiments of the present invention include a document base system that provides a first set of data representing at least one portion of a document that does not change and a variable data system that obtains information for a second set of data representing at least one other portion of the document that does change. A document combination system combines the first set of data and the second set of data with the obtained information to form a combined set of document image data for the document.

A method and a program storage device readable by a machine and tangibly embodying a program of instructions executable by the machine for processing documents in accordance with embodiments of the present invention include providing a first set of data representing at least one portion of a document that does not change, obtaining information for a second set of data representing at least one other portion of the document that does change, and combining the first set of data and the second set of data with the obtained information to form a combined set of document image data for the document.

The embodiments of the present invention advantageously enable processing just the portions of a document that may change rather than all the portions of the document where some of the portions do not change. Since the portions that do not change are not being repeatedly processed, document processing resources are saved.

DETAILED DESCRIPTION

Figure 1:
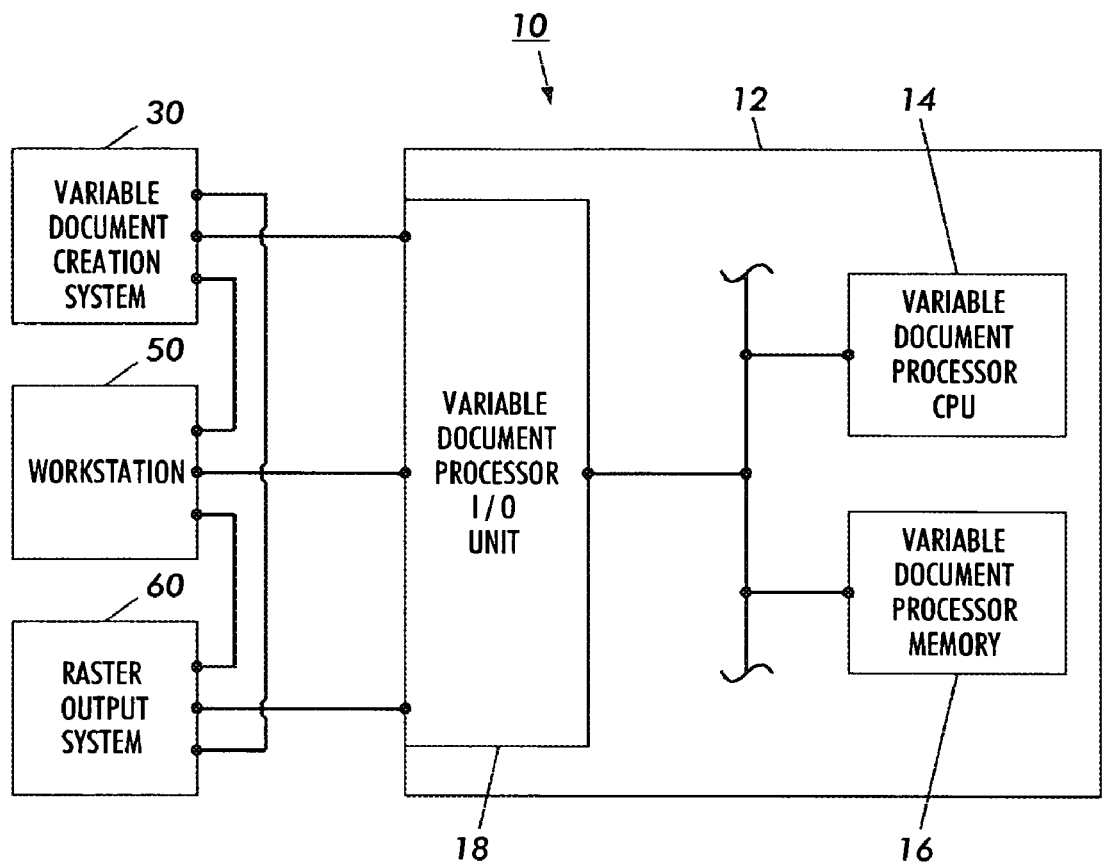
FIG. 1 is a block diagram of a system for processing documents in accordance with embodiments of the present invention.

A system 10 for processing documents in accordance with embodiments of the present invention is illustrated in FIG. 1. The system 10 includes a variable document processing system 12, variable document creation system 30, workstation 50, and a raster output system 60. The system 10 has a number of advantages, such as substantially reducing the number of times that the portions of a document which do not change are processed for rendering to conserve document processing resources.

Figure 2:
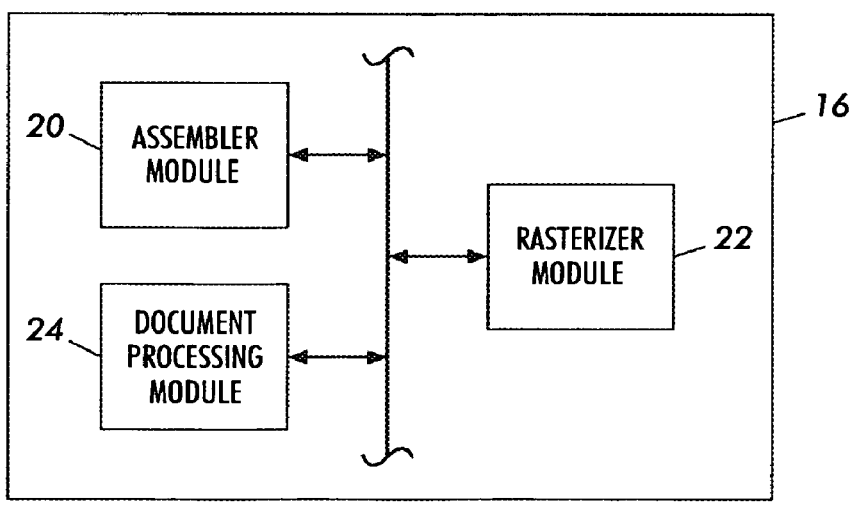
FIG. 2 is a functional block diagram of a portion of a variable document processor system used in the system for processing documents in accordance with embodiments of the present invention.

Referring more specifically to FIGS. 1 and 2, the variable document processing system 12 includes a variable document CPU 14, a variable document memory 16, and a variable document I/O unit 18, which are coupled together by one or more buses, although other types and numbers of components and other coupling techniques may be used. The variable document memory 16 comprises any type of fixed or portable memory accessible by the variable document CPU 14, such as ROM, RAM, SRAM, DRAM, DDRAM, hard and floppy-disks, CDs, DVDs, magnetic tape, optical disk, ferroelectric and ferromagnetic memory, electrically erasable programmable read only memory, flash memory, charge coupled devices, smart cards, or any other type of computer-readable media.

Figure 8:
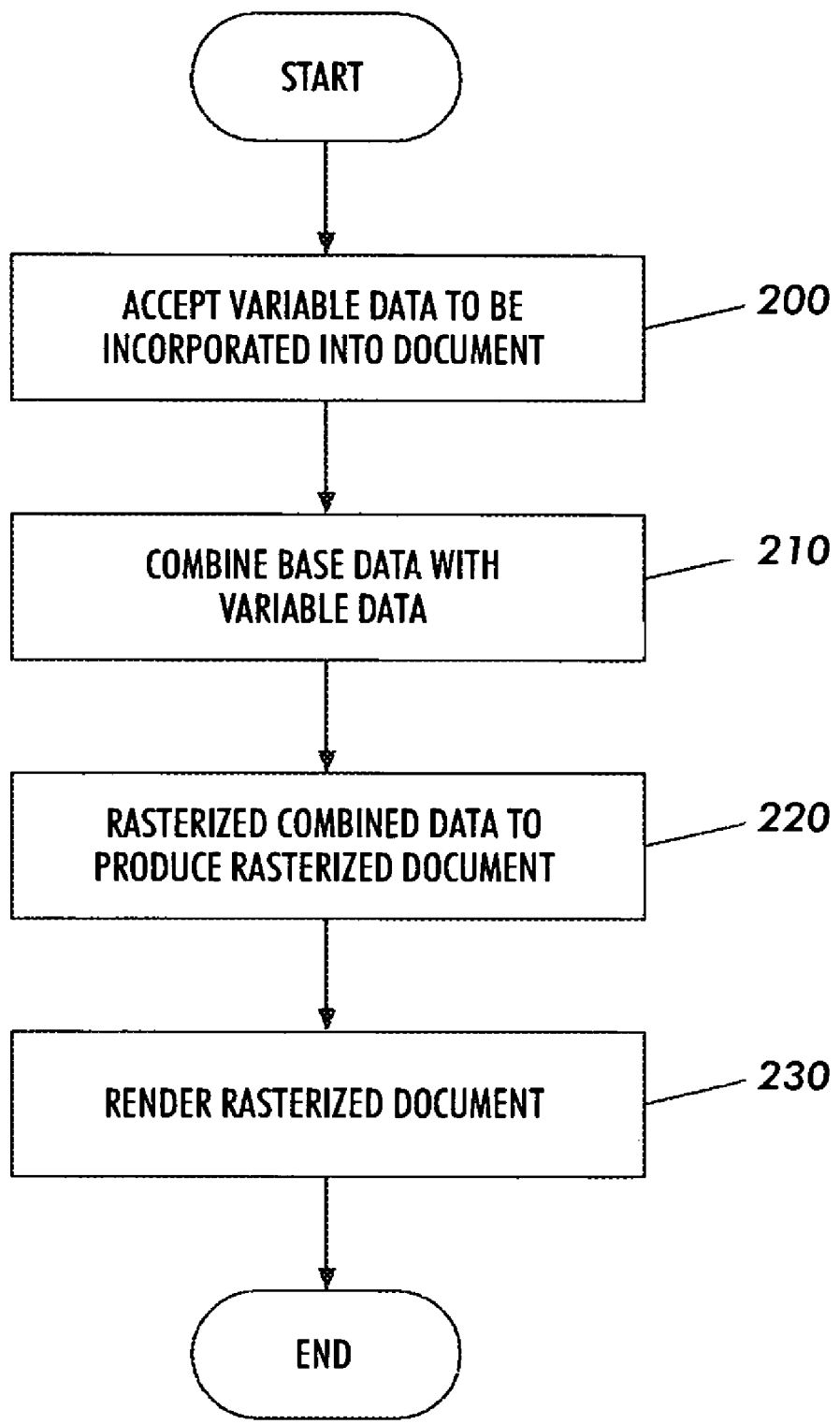
FIG. 8 is a flow chart of a process for processing variable data documents in accordance with embodiments of the present invention.
Figure 11:
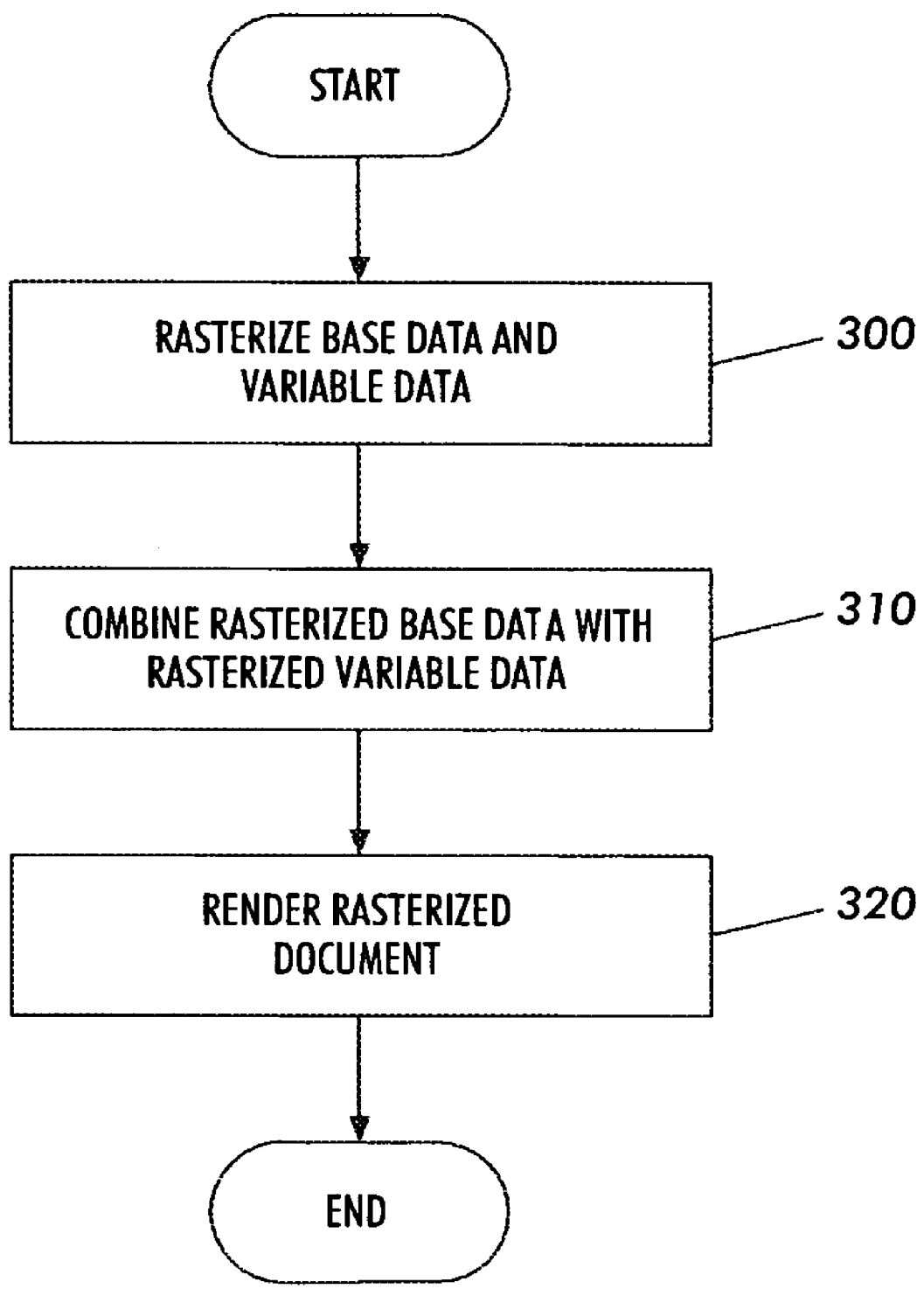
FIG. 11 is a flow chart of a process for processing variable data documents in accordance with embodiments of the present invention.

The variable document memory 16 stores instructions for execution by the variable document CPU 14, such as the instructions for processing documents as shown in FIGS. 8 and 11, although some or all of these instructions and data may be stored elsewhere. In embodiments of the present invention, the variable document memory 16 stores instructions that implement an assembler module 20, a rasterizer module 22, and a document processing module 24. The rasterizer module 22 can interpret printer description language files based on a mixed raster content model, such as TIFF-FX files or PDF files, although the module 22 may be capable of interpreting other file formats and models. A number of programming languages may be used to configure the variable document processing system 12 to generate and operate these modules as described herein, such as C, C++, Pascal, Assembly language, machine language, JAVA, Smalltalk, CLOS, Ada, or Object Pascal. Furthermore, these modules are illustrated and described based on their function for exemplary and clarity purposes only, and do not necessarily represent specific hardware or software.

The variable document I/O unit 18 may be connected to a network, such as the Internet or an Intranet, although the unit 18 may be connected directly to the components in system 10, such as variable document creation system 30, workstation 50 and/or raster output system 60, using wire-based and wireless mediums. The variable document I/O unit 18 has one or more ports capable of receiving data, such as segmented base data files, variable data files, and variable document description files, from variable document creation system 30 and/or workstation 50 via the network. Further, the variable document I/O unit 18 has one or more ports capable of sending data, such as assembled-rasterized documents, to components, such as raster output system 60.

Figure 3:
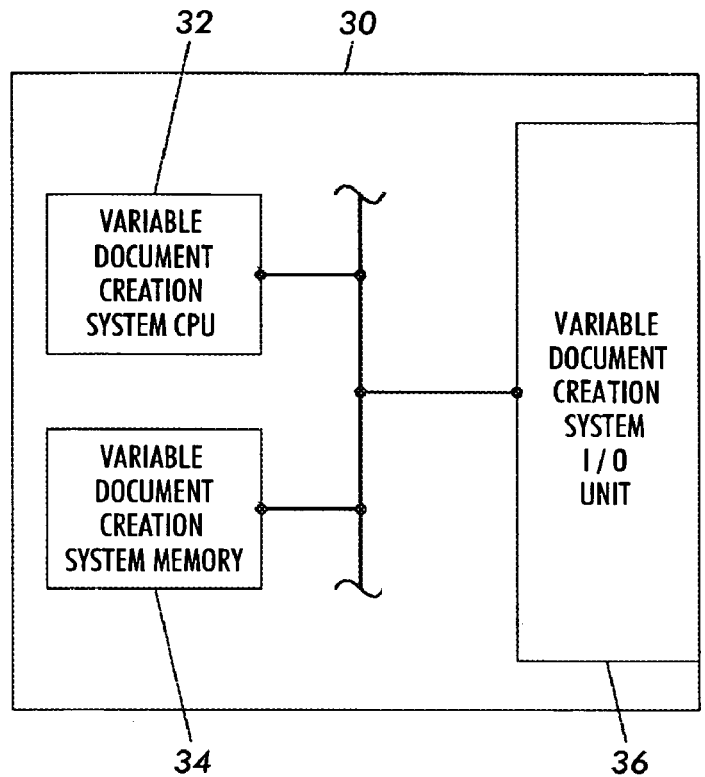
FIG. 3 is a block diagram of a variable document creation system used in the system for processing documents in accordance with embodiments of the present invention.
Figure 4:
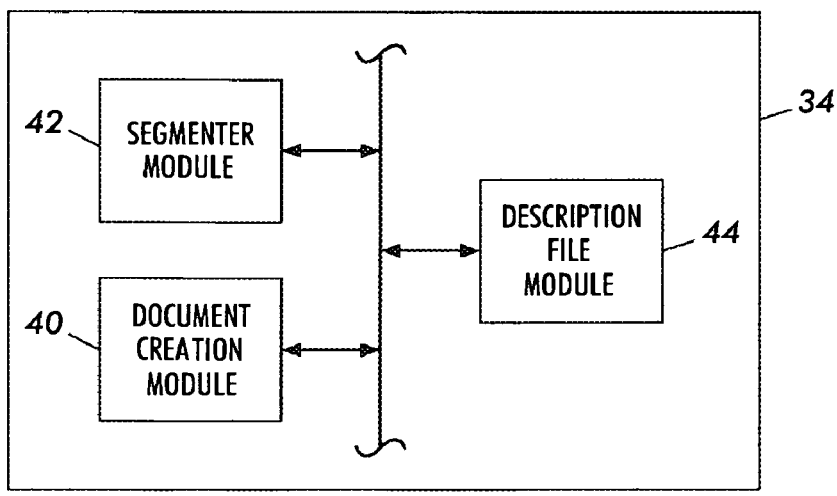
FIG. 4 is a functional block diagram of a portion of the variable document creation system in accordance with embodiments of the present invention.

Referring now to FIGS. 3 and 4, the variable document creation system 30 includes a variable document creation system CPU 32, a variable document creation system memory 34, and a variable document creation system I/O unit 36, which are coupled together by one or more buses, although other types and numbers of components and other coupling techniques may be used. The variable document creation system memory 34 comprises the same types of memory mentioned above in connection with the variable document processing system 12. The variable document creation system memory 34 stores instructions for execution by the variable document creation system CPU 32, such as for creating variable data documents as shown and described in connection with FIG. 5, although some or all of these instructions and data may be stored elsewhere.

In embodiments of the present invention, the variable document creation system memory 34 stores instructions that implement a document creation module 40, a segmenter module 42, and a description file module 44. The document creation module 40 can create and edit printer description language files based on a mixed raster content model, such as TIFF-FX files or PDF files, although the module 40 may be capable of creating and editing other file formats and models. The same types of programming languages mentioned above in connection with the modules in the variable document processing system 12 may be used to configure the variable document creation system 30 to generate and operate modules 40-44 as described herein. As in the case of the modules in the variable document processing system 12, modules 40-44 are illustrated based on their function for exemplary and clarity purposes only, and do not necessarily represent specific hardware or software. Further, the modules illustrated and described herein as being associated with either variable document processor system 12 or variable document creation system 30 are described in this manner for exemplary purposes only, as these modules may be situated in the same location or device, such as workstation 50.

The variable document creation system I/O unit 36 may be connected to a network, such as the Internet or an Intranet, although the unit 36 may be connected directly to the components in system 10, such as variable document processing system 12, using wire-based and wireless mediums. The variable document creation system I/O unit 36 has one or more ports capable of sending/receiving data to/from the components in system 10, such as the variable document processing system 12, workstation 50 and/or raster output system 60, via the network.

Referring back to FIG. 1, the workstation 50 comprises a personal computer, which includes a CPU, memory, an I/O unit, user input devices, such as a keyboard and mouse, and a display device, which are coupled together by one or more buses, although other types and numbers of components and other coupling techniques may be used. The memory stores instructions for execution by the processor, such as for accessing components in system 10 components including the document processing system 12, the variable document creation system 30, and/or the raster output system 60, although some or all of these instructions and data may be stored elsewhere. Further, the I/O unit may be connected to the components in system 10 via a network, such as the Internet or an Intranet. The I/O unit has one or more ports capable of receiving/sending data from/to the components in system 10.

The raster output system 60 comprises a laser raster output scanner, although the raster output system 60 may comprise a number of raster output devices including inkjet, dot-matrix, digital imagesetter or raster scan display devices. Since raster devices, such as raster output system 60, are well known in the art, their elements, their arrangement within the raster output system 60 and basic operation will not be described in detail here.

Figure 5:
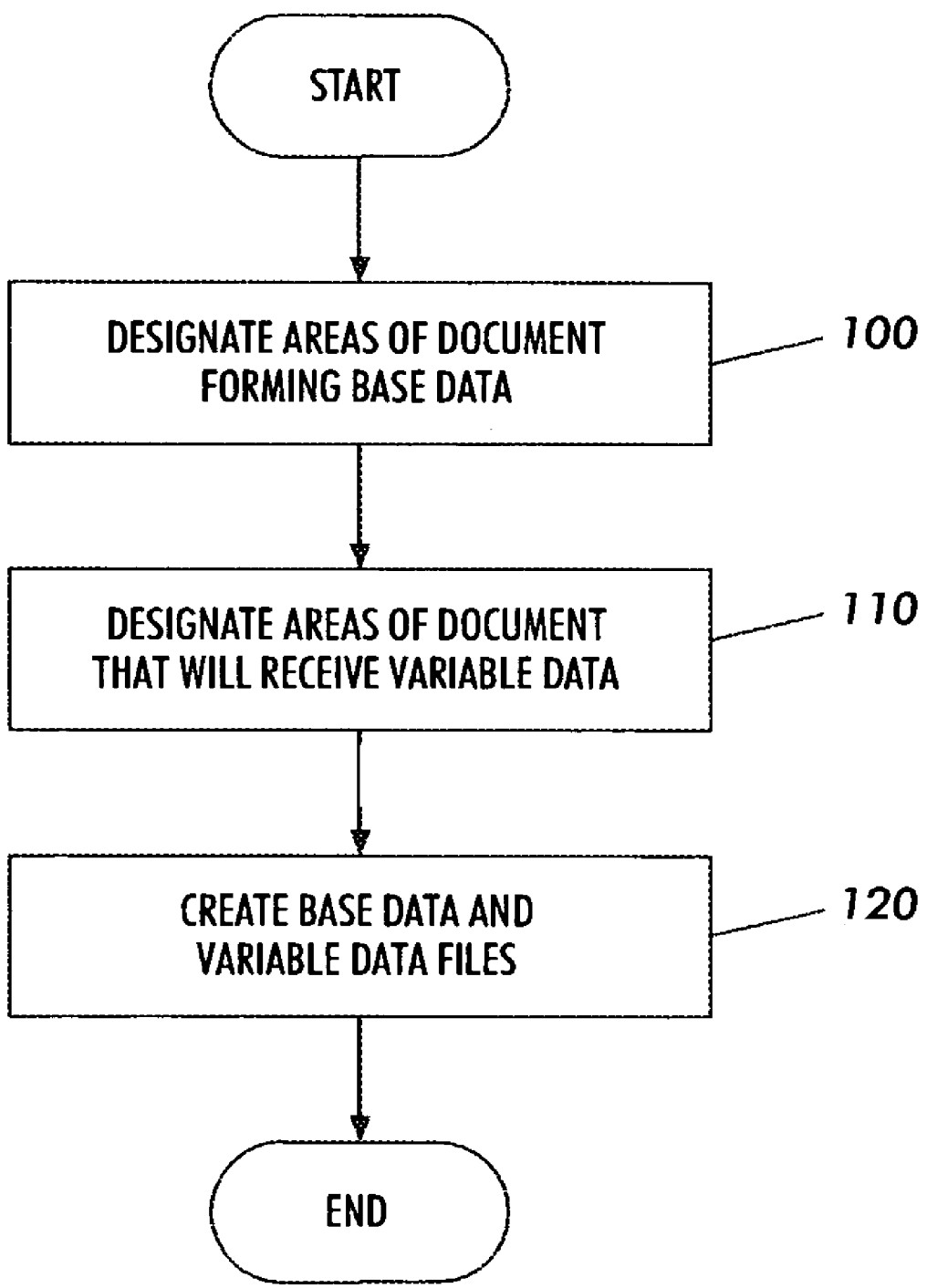
FIG. 5 is a flow chart of a process for creating variable data documents in accordance with embodiments of the present invention.

The operation of the system 10 for creating documents which include variable data in accordance with embodiments of the present invention will now be described with reference to FIGS. 1 and 3-7. Referring to FIG. 5 and beginning at step 100, a user operates the workstation 50 for accessing the variable document creation system 30 to generate a segmented base data file, a variable data file and a variable document description file.

Figure 6:
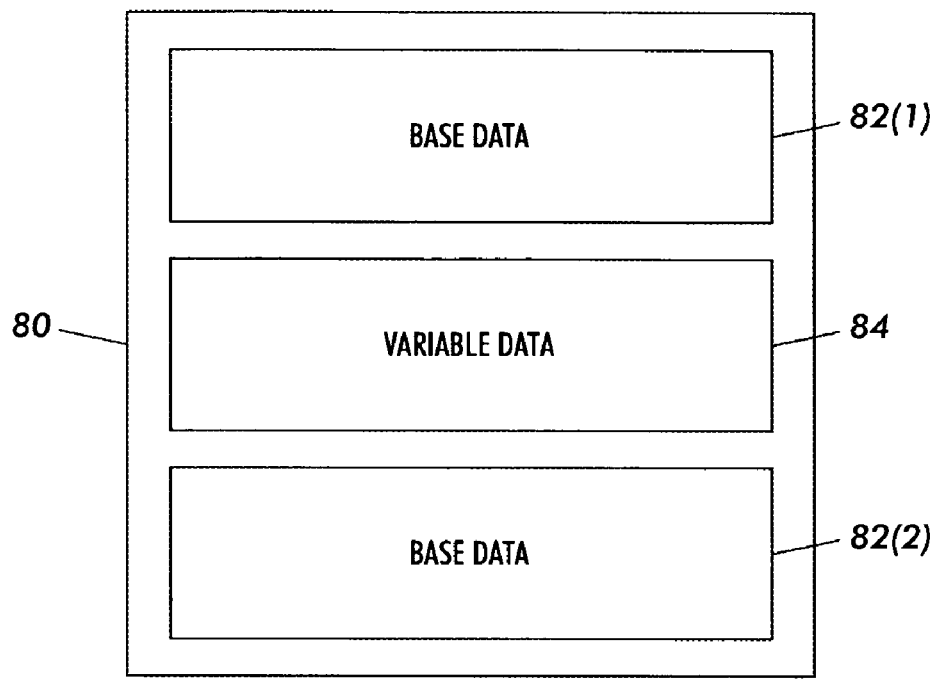
FIG. 6 is a diagram of an exemplary document.

In particular, the workstation 50 sends a page description language file, which describes a document 80 shown in FIG. 6, to the variable document creation system 30 where it is stored in the variable document creation system memory 34 for further processing by the document creation module 40 as described herein, although the file may already be stored in the memory 34 or the file and corresponding document 80 may be initially generated by the variable document creation system 30 using the document creation module 40. The page description language file is in a file format that is structured in accordance with a mixed raster content ("MRC") model, such as a TIFF-FX file, although the file may be structured in accordance with other imaging models and file formats.

A portion of the syntax of a page description language file for the document 80 may be organized as shown herein below in Table 1:

TABLE 1

[Strip0]
scanlines: 315
mask: /directory/.../mask-0 0 0
[Strip1]
scanlines: 300
mask: /directory/.../mask-1 0 0
foreground: /directory/.../fgnd-1 0 0
[Strip2]
scanlines: 1856
mask: /directory/.../mask-2 0 0

The exemplary syntax in Table 1 is provided for ease of description and illustrative purposes only, and may include a lesser or greater amount and other types of information. In this example, sections of the file denoted by the strip headings, such as "[Strip0]," contain information that describes segmentation information for portions of the document 80. These strip sections of the file can be interpreted by an MRC compliant imaging device or software application. Further, the page description language file may include a lesser or greater number of strip sections, the number of strips used depending on a number of factors, such as the size of the document 80, the types of images contained in the document 80, and user preferences, for example. Although the figures herein only show non-overlapping strips, other arrangements can be used, such as one with strips that overlap.

Figure 7:
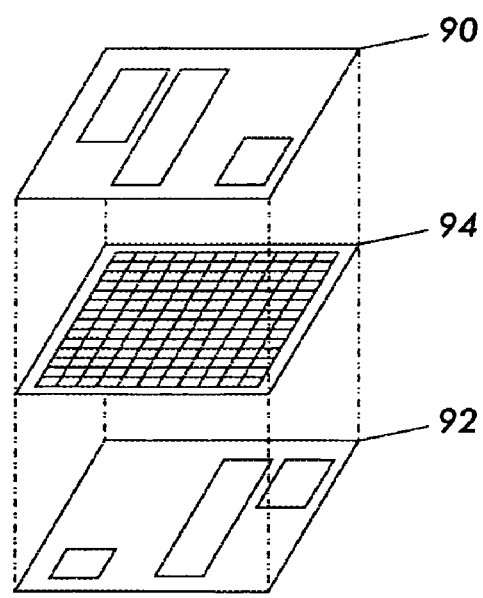
FIG. 7 is a perspective exploded view of an exemplary set of mixed raster content image planes representing a section of a document.

Referring to FIG. 6 and Table 1 provided above, "Strip0" has segmentation information for base data portion 82(1), "Strip1" has segmentation information for variable data portion 84, and "Strip2" has segmentation information for base data portion 82(2) of the document 80. The segmentation information in each strip section in the page description language file identifies locations, such as URLs, of one or more MRC layers for a portion of the document 80 corresponding to the particular strip section. Referring to FIG. 7, an exemplary foreground plane 90, background plane 92 and mask plane 94 are shown. These planes 90-94 include rasterized image data, such as pixels, that represent a portion of the document 80 that are referenced by one of the strip sections in the page description language file. When MRC layers, such as planes 90-94, are processed together by an MRC compliant device or software application, images can be generated.

Further, the one or more MRC layers referred to in each strip section are initially created using a process described in U.S. Pat. No. 6,324,305 to Holladay et al., assigned to the Xerox® Corporation, which is hereby incorporated by reference in its entirety, although other processes may be used. Thus, in this example, the foreground plane 90 and/or the background plane 92 can each include pixels that describe the original image data for a particular section of the document 80, such as base data portion 82(1) or 82(2). Further, the mask plane 94 is used to map pixels from an exact location on either the foreground plane 90 and/or the background plane 92 as disclosed by the '305 patent to Holladay et al.

Continuing in step 100, the document creation module 40 causes the workstation 50 to present the contents of the exemplary page description language file shown in Table 1 along with one or more user interfaces, such as menus and/or windows (not illustrated), using the display device of the workstation 50, although other types of user interfaces may be used. The user designates one or more areas in the page description language file, such as one or more of the strip sections, corresponding to one or more portions of the document 80, such as the base data portions 82(1), 82(2), that will likely remain unchanged using a mouse and a text/image selection mechanism. Further, the user provides input, such as a mouse click on a displayed button, to indicate that they have made their selection(s). In response, the workstation 50 communicates the selection information to the document creation system 30, and the document creation module 40 stores the selection information in a temporary buffer in the variable document creation system memory 34 for further processing as described herein.

At step 110, the user designates one or more areas in the page description language file, which again can be the strip sections, corresponding to one or more portions of the document that will likely change, such as the variable data portion 84, using the mouse and text/image selection mechanism, and indicates their completed selection(s). The workstation 50 communicates the selection information to the document creation module 40, which stores the selection information in a temporary buffer in the variable document creation system memory 34 for further processing as described herein.

At step 120, the segmenter module 42 in the document creation system memory 34 uses the selection information to create the segmented base data file and the variable data file. In particular, the segmenter module 42 constructs the segmented base data file to include just the portions of the exemplary page description language file shown in Table 1 which describe the areas of the exemplary document 80 that will not likely change as indicated at step 100, such as the base data portions 82(1), 82(2). Thus, a portion of the syntax of the segmented base data file for the document 80 may be organized as shown herein below in Table 2:

TABLE 2

[Strip0]
scanlines: 315
mask: /directory/.../mask-0 0 0
[Strip2]
scanlines: 1856
mask: /directory/.../mask-2 0 0

The exemplary syntax in Table 2 is provided for ease of description and illustrative purposes only, and may include a lesser or greater amount and other types of information. As will become apparent from embodiments of the present invention as described further herein below, creating the segmented base data file substantially reduces the number of times the portions of the document 80 which will not likely change are processed. This results in saving resources of the variable document processor 12.

The description file module 44 constructs a variable data document description file that stores the name and location of the base segmented base data file, such as a file name in a particular directory or a URL, and stores strip identification information describing the particular strip sections that are included in the segmented base data file, such as "Strip0" and "Strip2". The variable data document description file is used during an assembly and rasterization process, which will be described further herein below in connection with steps 200-230 and steps 300-310, for example.

The segmenter module 42 constructs the variable data file to include just the portions of the exemplary page description language file shown in Table 1 which describe the areas of the document that will likely change as indicated at step 110, such as the variable data portion 84. Where the exemplary syntax shown above in Table 1 represents an existing document 80, as in this example, one or more of the strip sections selected by the user at step 110 may describe a location of the image data for each of one or more MRC layers for the particular section, such as "Strip1" in this example. The segmenter module 42 replaces the location information of the image data for each MRC layer in each strip with an identifier, such as a "MASK_VAR_DATA" identifier for the mask layer and a "FOREGROUND_VAR_DATA" identifier for the foreground layer, although other numbers and types of identifiers may be used depending on the number and types of layers in the section. Further, the identifiers used for each strip section may represent a temporary memory allocation for holding the location information or an array data structure where the variable data file includes a plurality of strip sections.

A portion of the syntax of the variable data file for the document 80 may be organized as shown herein below in Table 3:

TABLE 3

[Strip1]
scanlines: 300
mask: MASK_VAR_DATA
foreground: FOREGROUND_VAR_DATA

The exemplary syntax in Table 3 is provided for ease of description and illustrative purposes only, and may include a lesser or greater amount and other types of information. Further, the description file module 44 augments the variable document description file to include the name and location of the variable data file, such as a file name in a particular directory or URL, and adds strip identification information describing the particular strip sections that are included in the variable data file, such as "Strip1". The description file module 44 may also include further information in the description file in connection with the variable data file, such as the dimensions of the variable data portion 84 of the document 80 and/or a directory or a URL where the image data for each layer of each section may be found.

A portion of the syntax of the variable document description file for the document 80 may be organized as shown herein below in Table 4:

TABLE 4

[Base]
Base_File_Name: .../.../foo_base
Strip Data: [Strip0], [Strip2]
[Var]
Var_File_Name: .../.../foo_var
Strip Data: [Strip1]
[Strip1]
MASK_VAR_DATA
FOREGROUND_VAR_DATA The exemplary syntax in Table 4 is provided for ease of description and illustrative purposes only, and may include a lesser or greater amount and other types of information.

At this point in the process, the document creation module 40 routes the segmented base data file, the variable data file and the variable document description file to the variable document creation system I/O unit 36 for sending the files to the workstation 50. The workstation 50 stores the files in the memory of the workstation 50 for further processing as described further herein below.

A method for processing documents which includes variable data in accordance with embodiments of the present invention will now be described with reference to FIGS. 1-2, 5 and 8-9. Steps 100-120 are performed in the same manner described above. Referring to FIG. 8 and beginning at step 200, a user operates the workstation 50 for accessing the variable document processing system 12 to generate an assembled rasterized document. The workstation 50 sends the variable document description file to the processing system 12, which routes the file to the document processing module 24 in the variable document processor memory 16. The document processing module 24 reads the contents of the variable document description file into memory 16 to determine the locations of the segmented base data file and the variable data file.

The document processing module 24 retrieves the variable data file and the segmented base data file from their respective locations as indicated in the variable document description file, such as from a particular directory within the workstation 50. The document processing module 24 then reads the contents of the variable document description file to determine what data needs to be retrieved for the variable data file. In particular, the module 24 searches for a "MASK_VAR_DATA" identifier and at least one of a "FOREGROUND_VAR_DATA" and a "BACKGROUND_VAR_DATA" identifier for each MRC layer in each strip section in the variable data file as described in the description file. In this example, the variable data file has just "Strip1" segmentation information, and thus the module 24 finds a "MASK_VAR_DATA" and a "FOREGROUND_VAR_DATA" identifier associated with the "Strip1" information in the variable document description file shown above in Table 4.

The document processing module 24 causes the workstation 50 to present one or more user interfaces, such as menus and/or windows (not illustrated), using the display device of the workstation 50, although other types of user interfaces may be used. The module 24 causes the workstation 50 to prompt the user to input location information of image data for each MRC layer in each strip section in the variable data file, such as a directory path to a specific file or a URL, which corresponds to each identifier found in the variable document description file. In this example, the location information corresponds to the MRC layers for the variable data portion 84 of the document 80 shown in FIG. 6. Of course, this assumes the variable data portion 84 of the document 80 has already been segmented into one or more MRC layers. If the variable data portion 84 of the document 80 has not been segmented into MRC layers, then the portion 84 will need to be segmented using the process disclosed in the Holladay '305 patent as described above in connection with step 100.

Once the user inputs the location information of the image data, the document processing module 24 updates the variable data file by replacing the "MASK_VAR_DATA" identifier and one or more of a "FOREGROUND_VAR_DATA" and a "BACKGROUND_VAR_DATA" identifier in the file with the corresponding location information as appropriate although other types of replacements can be implemented, such as just replacing the "MASK_VAR_DATA" identifier, the "FOREGROUND_VAR_DATA" or the "BACKGROUND_VAR_DATA." In this example, again, the variable data file has just "Strip1" segmentation information, and thus the module 24 replaces the "MASK_VAR_DATA" and the "FOREGROUND_VAR_DATA" identifiers within the file with the input location information of the image data.

In this example, the user inputs "/directory/ . . . /new_1_mask" when requested for location information of the MRC layer corresponding to the "MASK_VAR_DATA" identifier, and "/directory/ . . . /new_1_foreground" when requested for location information of the MRC layer corresponding to the "FOREGROUND_VAR_DATA" identifier. A portion of the syntax of the variable data file for the document 80 may be organized as shown herein below in Table 5:

TABLE 5

[Strip1]
scanlines: 300
mask: /directory/.../new_1_mask 0 0
foreground: /directory/.../new_1_foreground 0 0

The exemplary syntax in Table 5 is provided for ease of description and illustrative purposes only, and may include a lesser or greater amount and other types of information.

With regard to the segmented base data file, since the strip sections in the base data file define the portions of the document 80 that will not change, such as the base data portions 82(1) and 82(2) shown in FIG. 6, the MRC layers for each portion 82(1) and 82(2) are already available for further use by the document processing system 12 as described herein.

Thus, no further processing with respect to segmenting the base data portions 82(1) and 82(2) into MRC layers is required. As mentioned earlier, this saves considerable processing resources since the only image data for the document 80 that may need to be further processed with respect to being segmented into MRC layers is the variable data portion 84 in this example. For ease of discussion and illustration, just three strip sections with one variable data portion 84 have been used in this example. But, processing a document 80 with a few variable data portions 84 and hundreds, if not thousands, of base data strip portions 82(1) and 82(2) in the manner described herein clearly show how document processing resources can be saved.

At step 210, the document processing module 24 routes the segmented base data file, the updated variable data file, and the variable document description file to the assembler module 20. The assembler module 20 combines the segmented base data file and the updated variable data file to create an assembled-unrasterized segmented document. In particular, the assembler module 20 reads the variable document description file to determine the proper order that the strip sections from the segmented base data file and the variable data file should be included in the assembled-unrasterized document. A portion of the syntax of the assembled-unrasterized document may be organized as shown herein below in Table 6:

TABLE 6

[Strip0]
scanlines: 315
mask: /directory/.../mask-0 0 0
[Strip1]
scanlines: 300
mask: /directory/.../new_1_mask 0 0
foreground: /directory/.../new_1_foreground 0 0
[Strip2]
scanlines: 1856
mask: /directory/.../mask-2 0 0

The exemplary syntax in Table 6 is provided for ease of description and illustrative purposes only, and may include a lesser or greater amount and other types of information.

At step 220, the document processing module 24 causes the assembler module 20 to route the assembled-unrasterized document to the rasterizer module 22. The rasterizer module 22 rasterizes the assembled-unrasterized document to create an assembled-rasterized document.

Figure 9:
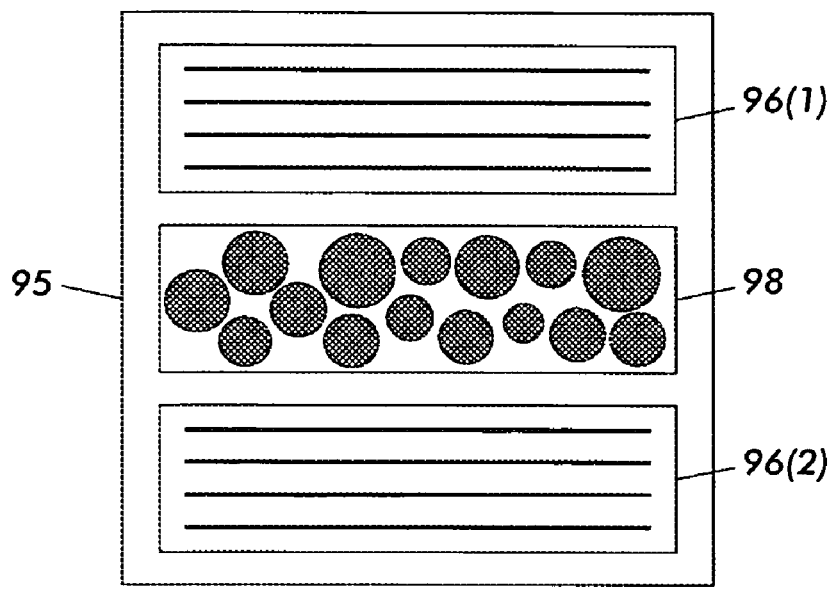
FIGS. 9-10 are exemplary screen prints of variable data documents.

At step 230, the document processing module 24 causes the rasterizer module 22 to route the assembled-rasterized document to the raster output system 60. The raster output system 60 images the assembled-rasterized document to create a printout of a variable data document 95, as shown in FIG. 9, although the document 95 could be displayed where the raster output system 60 is a display device. The variable data document 95 includes a first section 96(1) and a second section 96(2) that correspond to the "Strip0" and "Strip2" sections, respectively, in the assembled-unrasterized document as shown above in Table 6. The third section 98 with the solid spheres corresponds to the "Strip1" section in the assembled-unrasterized document. The solid spheres in the third section 98 are generated from the combined, processed MRC layer image data whose location information was input at step 200.

A method for processing documents which include variable data in accordance with embodiments of the present invention will now be described with reference to FIGS. 1-2, 5, 8 and 10. Steps 100-120 are performed in the same manner described above. Referring back to FIG. 8 at step 200, in this example, the user inputs "/directory/ . . . /new_2_mask" when requested for location information of the MRC layer corresponding to the "MASK_VAR_DATA" identifier, and "/directory/ . . . /new_2_foreground" when requested for location information of the MRC layer corresponding to the "FOREGROUND_VAR_DATA" identifier. A portion of the syntax of the variable data file for the document 80 may be organized as shown herein below in Table 7:

TABLE 7

[Strip1]
scanlines: 300
mask: /directory/.../new_2_mask 0 0
foreground: /directory/.../new_2_foreground 0 0

The exemplary syntax in Table 7 is provided for ease of description and illustrative purposes only, and may include a lesser or greater amount and other types of information.

Figure 10:
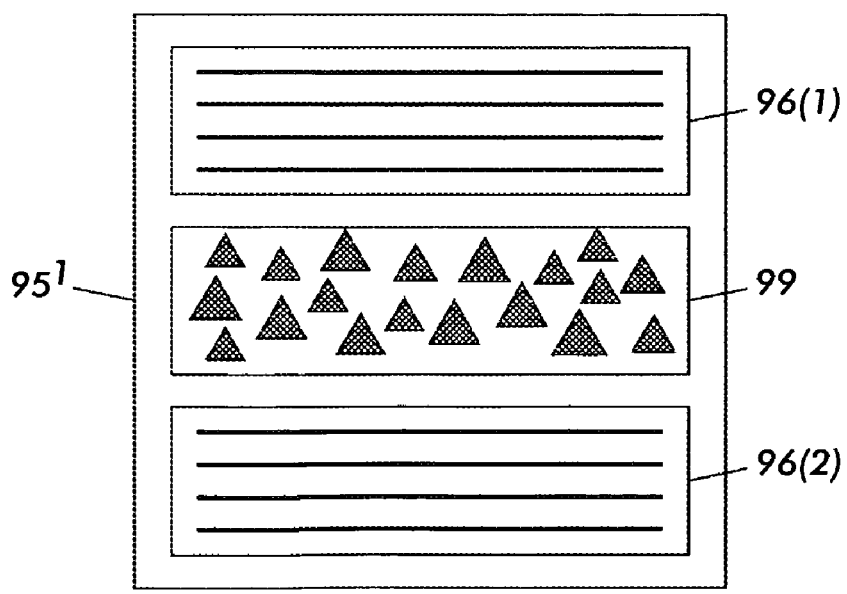

Steps 210-230 are performed as described above, except at step 230 the raster output system 60 images the assembled-rasterized document to create a printout of variable data document 95', as shown in FIG. 10. The variable document 95' is the same as the variable data document 95 shown in FIG. 9, except the document 95' includes a fourth section 99 that corresponds to the "Strip1" section in the assembled-unrasterized document. The solid triangles in the fourth section 99 are generated from the combined, processed MRC layer image data whose location information was input at step 200 as described herein.

An alternative process for processing documents which include variable data in accordance with embodiments of the present invention will now be described with reference to FIGS. 1-9 and 11. Steps 100-120 and step 200 are performed in the same manner described above. Thereafter, in this example, instead of performing steps 210-230, steps 300-310 are performed as described herein. Accordingly, and referring to FIG. 11 at step 300, the document processing module 24 routes the segmented base data file, the variable data file, and the variable document description file to the rasterizer module 22.

The rasterizer module 22 rasterizes each one of the segmented base data file and the variable data file to create a rasterized base data file and a rasterized variable data file. During the rasterization of the base data and variable data files, the module 22 updates the information in the variable data document description file as necessary to modify the strip information to refer to the appropriate sections in the rasterized base data file and the rasterized variable data file that correspond to the strip sections. Further, the document processing module 24 updates the location information in the variable data document description file to refer to the rasterized base data file and the rasterized variable data file instead of the segmented base data file and the variable data file, respectively. Further, copies of the rasterized files and the description file are stored in the variable document processing memory 16 for further processing as described herein.

At step 310, the document processing module 24 causes the rasterizer module 22 to route the rasterized base data file, the rasterized variable data file, and the variable data document description file to the assembler module 20. The assembler module 20 combines the rasterized base data file and the rasterized variable data file to create an assembled-rasterized document. In particular, the assembler module 20 reads the variable document description file, updated as described herein in connection with step 300, to determine the proper order that the sections of the rasterized base data and variable data files corresponding to the strip sections in the unrasterized segmented base data and variable data files should be included in the assembled-rasterized document.

At step 320, the document processing module 24 causes the assembler module 20 to route the assembled-rasterized document to the raster output system 60. The raster output system 60 images the assembled-rasterized document to create a printout of a variable document 95, as shown in FIG. 9, although the document 95 could be displayed where the raster output system 60 is a display device, and/or the document 95' shown in FIG. 10 may be printed or displayed if different data is used to create the document. The variable document 95 includes a first section 96(1) and a second section 96(2) that correspond to the "Strip0" and "Strip2" sections in the segmented base data file. The third section 98 with the solid spheres corresponds to the "Strip1" section in the variable data file. The solid spheres in the third section 98 are generated from the combined, processed MRC layer image data whose location information was input at step 200.

In embodiments of the present invention, steps 100-120, 200 and 300-310 may be repeated thereafter a plurality of times, except the user can input different location information for the MRC layer corresponding to the "MASK_VAR_DATA" and the "FOREGROUND_VAR_DATA" identifiers at step 200. Since a copy of the rasterized base data file is stored in the variable document processor memory 16 as mentioned above in connection with step 300, just the variable data file needs to be rasterized to create the rasterized variable data file during step 310. This saves even more document processing resources of the variable document processing system 12 since the portions of the document 80 that are indicated by the user at step 100 as not likely changing are not being repeatedly rasterized.

An alternative process for processing documents which include variable data in accordance with embodiments of the present invention will now be described with reference to FIGS. 1-9 and 11. Steps 100-120, 200 and 300-320 are performed as described above, except at step 100, the user at workstation 50 is also prompted by the variable document creation system 30 to input the type of device that will be ultimately used to image the variable document, such as the raster output system 60, and/or any rasterization levels that the variable document should be rasterized at, although this information may be requested at other times during the process.

Further, at step 120, the variable document creation system 30 adds the information describing the type of device and/or the rasterization levels that will be used to image the variable document to the variable document description file, although this information may be added to the file at other times during the process.

At step 300, the document processing module 24 reads the variable document description file to ascertain the type of device that will be ultimately used to image the variable document. Using this information, the document processing module 24 determines the appropriate rasterization level that the segmented base data file and the variable data file should be rasterized at, although the module 24 may extract this information directly from the contents of the variable document description file where the file explicitly specifies the rasterization levels. The rasterizer module 22 rasterizes the segmented base data file and variable data file at the appropriate rasterization level based on the information in the variable document description file to create a rasterized base data file and a rasterized variable data file. Thereafter, steps 310-320 are performed in the same manner described above.

Although the alternative process using information describing the type of device and/or the rasterization levels to determine the appropriate rasterization level that the base data and variable data files should be rasterized at has been described above in connection with steps 100-120, 200, and 300-320, this alternative process may be performed in connection with steps 210-230 instead of steps 300-320 in the same manner.

In sum, the system 10 adds a small amount of data, which can be variable or different for each document, to a larger amount of base data, that is likely to remain the same for each document 80. The variable data and the base data are combined, and the resulting variable data document 95 is rendered, such as by printing or displaying. The system 10 advantageously enables processing just the portions of a document 80 that may change, rather than requiring all the portions of the document to be processed each time the document 80 is rendered. Since some portions of the documents 80 may not change and are therefore not being repeatedly processed, document processing resources of the system 10 are saved.

While the present invention in accordance with embodiments of the present invention has been described using MRC techniques, those skilled in the art will recognize that it may be adapted for use with other methods and apparatuses, and the embodiments are therefore not limited to this description. The techniques described herein are suitable for use in various devices required for storing or transmitting color documents, such as facsimile devices and image storage devices. Further, the image processing techniques disclosed herein may be applied to gray-scale black and white and color documents.

While particular embodiments have been described, alternatives, modifications, variations, improvements, and substantial equivalents that are or may be presently unforeseen may arise to applicants or others skilled in the art. Accordingly, the appended claims as filed, and as they may be amended, are intended to embrace all such alternatives, modifications, variations, improvements, and substantial equivalents. Further, the recited order of processing elements or sequences, or the use of numbers, letters, or other designations therefor, is not intended to limit the claimed processes to any order except as may be specified in the claims.

What is claimed is:

1. An apparatus, comprising:
    a document base unit that provides a first set of data representing one or more first strip sections corresponding to a portion of a document that does not change wherein the one or more first strip sections is stored in a base data file;
    a variable data unit that obtains information for a second set of data representing one or more second strip sections corresponding to one other portion of the document that does change, wherein the obtained information comprises updated information about at least one of a first identifier corresponding to a mask layer and a second identifier corresponding to a foreground layer, the first and the second identifier each included in the one or more second strip sections associated with the second set of data, wherein the one or more second strip sections is stored in a variable data file, and
    wherein the obtained information comprises retrieved data relating to the one or more second strip sections stored in the variable data file from a variable document description file comprising data related to name and location of the variable data file, and strip sections stored in the variable data file wherein the obtained information replaces the first identifier and the second identifier in the variable data file with corresponding location information;

wherein the location information is updated in the variable data file to refer to a rasterized base data file and a rasterized variable data file; imaging information describing rasterization levels is added to the variable document description file; wherein the appropriate rasterization level the base data file and the variable data file should be rasterized at is determined based on the imaging information; and a document combination unit that combines the first set of data and the second set of data with the obtained information to form a combined set of document image data for the document.

2. The apparatus as set forth in claim 1 further comprising a document processing unit that independently converts the first set of data and the second set of data with the obtained information into a format that is understood and used by a device to present the document before combining the first and second sets of data.

3. The apparatus as set forth in claim 2 wherein the document processing unit creates a first set of rasterization data based on the first set of data and a second set of rasterization data based on the second set of data.

4. The apparatus as set forth in claim 1 further comprising a document processing unit that converts the combined set of document image data into a format that is understood and used by a device to present the document.

5. The apparatus as set forth in claim 4 wherein the document processing unit creates a set of rasterization data based on the combined set of document image data.

6. The apparatus as set forth in claim 1 wherein each of the first and second sets of data are in at least one of a mixed raster content file, a page description language file, a data structure, and a rasterized image file.

7. The apparatus as set forth in claim 1 further comprising a document processing unit that creates a set of rasterization data for the document at an appropriate resolution for a device used for presenting the document.

8. The apparatus as set forth in claim 1 further comprising a presentation unit that presents substantially all of the portions of the document using the combined set of document image data.

9. The apparatus as set forth in claim 8 wherein the presentation unit comprises at least one of a printing device and a display device.

10. The system apparatus as set forth in claim 1 wherein the one or more identifiers replaces location information of image data for each of the mask layer and the foreground layer.

11. The apparatus as set forth in claim 1, wherein the first strip section is stored in a base data file, and wherein the variable document description file comprises data related to name and location of the base data file, and strip sections stored in the base data file.

12. The apparatus as set forth in claim 1, wherein the one or more identifiers represent a temporary memory allocation for holding the location information.

13. A method comprising:
providing a first set of data to a document processing unit representing one or more first strip sections corresponding to a portion of a document that does not change, wherein the one or more first strip sections is stored in a base data file;

obtaining information at the document processing unit for a second set of data representing one or more second strip sections corresponding to one other portion of the document that does change, wherein said obtaining comprises updating at least one of a first identifier corresponding to a mask layer and a second identifier corresponding to a foreground layer, the first and the second identifier each included in the one or more second strip sections associated with the second set of data, wherein the one or more second strip sections is stored in a variable data file, and wherein the obtaining comprises retrieving data relating to the one or more second strip sections stored in the variable data file from a variable document description file, comprising data related to name and location of the variable data file, and strip sections stored in the variable data file and replacing the first identifier and the second identifier in the variable data file with corresponding location information, updating the location information in the variable data file to refer to a rasterized base data file and a rasterized variable data file;

adding imaging information describing rasterization levels to the variable document description file;

determining the appropriate rasterization level the base data file and the variable data file should be rasterized at based on the imaging information;

combining the first set of data and the second set of data with the obtained information to form a combined set of document image data for the document; and outputting the combined set of document image data to an imaging device for displaying or printing.

14. The method as set forth in claim 13 further comprising independently converting the first set of data and the second set of data with the obtained information into a format that is understood and used by a device to present the document before combining the first and second sets of data.

15. The method as set forth in claim 14 wherein the independently converting the first and second sets of data further comprises creating a first set of rasterization data based on the first set of data and a second set of rasterization data based on the second set of data.

16. The method as set forth in claim 13 further comprising converting the combined set of document image data into a format that is understood and used by a device to present the document.

17. The method as set forth in claim 16 wherein the converting the combined set of document image data further comprises creating a set of rasterization data based on the combined set of document image data.

18. The method as set forth in claim 13 wherein each of the first and second sets of data are in at least one of a mixed raster content file, a page description language file, a data structure, and a rasterized image file.

19. The method as set forth in claim 13 further comprising creating a set of rasterization data for the document at an appropriate resolution for a device used for presenting the document.

20. The method as set forth in claim 13 further comprising presenting substantially all of the portions of the document using the combined set of document image data.

21. The method as set forth in claim 13 wherein the one or more identifiers replaces location information of image data for each of the mask layer and the foreground layer.

22. The method as set forth in claim 13, wherein the first strip section is stored in a base data file, and wherein the variable document description file comprises data related to name and location of the base data file, and strip sections stored in the base data file.

23. The method as set forth in claim 13, wherein the one or more identifiers represent a temporary memory allocation for holding the location information.

24. A non-transitory computer-readable medium having stored thereon instructions, which when executed by at least one processor, causes the processor to perform:

providing a first set of data to a document processing unit representing one or more first strip sections corresponding to a portion of a document that does not change wherein the one or more first strip sections is stored in a base data file;

obtaining information at the document processing unit for a second set of data representing one or more second strip sections corresponding to one other portion of the document that does change, wherein said obtaining comprises updating at least one of a first identifier corresponding to a mask layer and a second identifier corresponding to a foreground layer, the first and the second identifier each included in the one or more second strip sections associated with the second set of data, wherein the one or more second strip sections is stored in a variable data file, wherein the obtaining comprises retrieving data relating to the one or more second strip sections stored in the variable data file from a variable document description file comprising data related to name and location of the variable data file, and strip sections stored in the variable data file and replacing the first identifier and the second identifier in the file variable data with corresponding location information;

updating the location information in the variable data file to refer to a rasterized base data file and a rasterized variable data file;

adding imaging information describing rasterization levels to the variable document description file;

determining the appropriate rasterization level the base data file and the variable data file should be rasterized at based on the imaging information; and combining the first set of data and the second set of data with the obtained information to form a combined set of document image data for the document.

25. The medium as set forth in claim 24 further comprising independently converting the first set of data and the second set of data with the obtained information into a format that is understood and used by a device to present the document before combining the first and second sets of data.

26. The medium as set forth in claim 25 wherein the independently converting the first and second sets of data further comprises creating a first set of rasterization data based on the first set of data and a second set of rasterization data based on the second set of data.

27. The medium as set forth in claim 24 further comprising converting the combined set of document image data into a format that is understood and used by a device to present the document.

28. The medium as set forth in claim 27 wherein the converting the combined set of document image data further comprises creating a set of rasterization data based on the combined set of document image data.

29. The medium as set forth in claim 24 wherein each of the first and second sets of data are in at least one of a mixed raster content file, a page description language file, a data structure, and a rasterized image file.

30. The medium as set forth in claim 24 further comprising creating a set of rasterization data for the document at an appropriate resolution for a device used for presenting the document.

31. The medium as set forth in claim 24 further comprising presenting substantially all of the portions of the document using the combined set of document image data.

32. The medium as set forth in claim 24 wherein the one or more identifiers replaces location information of image data for each of the mask layer and the foreground layer.

33. The medium as set forth in claim 24, wherein the first strip section is stored in a base data file, and wherein the variable document description file comprises data related to name and location of the base data file, and strip sections stored in the base data file.

34. The medium as set forth in claim 24, wherein the one or more identifiers represent a temporary memory allocation for holding the location information.

* * * * *